US007729545B2

(12) United States Patent
Abe et al.

(10) Patent No.: US 7,729,545 B2
(45) Date of Patent: Jun. 1, 2010

(54) SIGNAL PROCESSING METHOD AND METHOD FOR DETERMINING IMAGE SIMILARITY

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 10/451,360

(22) PCT Filed: Oct. 16, 2002

(86) PCT No.: PCT/JP02/10749

§ 371 (c)(1),
(2), (4) Date: Jun. 19, 2003

(87) PCT Pub. No.: WO03/036563

PCT Pub. Date: May 1, 2003

(65) Prior Publication Data

US 2004/0057627 A1    Mar. 25, 2004

(30) Foreign Application Priority Data

Oct. 22, 2001  (JP)  ............................. 2001-324255

(51) Int. Cl.
*G06K 9/68* (2006.01)
*G06K 9/36* (2006.01)

(52) U.S. Cl. ..................................... 382/219

(58) Field of Classification Search ................. 382/162, 382/164, 165, 173, 181, 190, 195, 219, 220, 382/232, 236, 305, 243; 375/240; 348/155, 348/405, 409, 413, 415, 416, 418
See application file for complete search history.

(56) References Cited

U.S. PATENT DOCUMENTS 3,576,534 A * 4/1971 Steinberger ................. 382/221

(Continued)

FOREIGN PATENT DOCUMENTS

EP    0869445 A2    10/1998

(Continued)

OTHER PUBLICATIONS

The Transaction of the Institute of Electronics, Information and Communication Engineers D-II, Oct. 1, 2001, vol. J84-D-II, No. 10, pp. 2270-2279.

(Continued)

*Primary Examiner*—Amir Alavi
(74) *Attorney, Agent, or Firm*—Robert J. Depke; Rockey, Depke & Lyons, LLC (57) ABSTRACT

A first image of two images to be compared for similarity is divided into small areas and one small area is selected for calculating the correlation with a second image using a correlative method. Then, the position difference, luminance ratio and similarity in an area where the similarity, which is the square of the correlation value, reaches its maximum, are found. Values based on the similarity are integrated at a position represented by the position difference and the luminance ratio. Similar processing is performed with respect to all the small areas, and at a peak where the maximum integral value of the similarity is obtained, its magnitude is compared with a threshold value to evaluate the similarity. By extracting the small area voted for that peak, it is possible to extract a similar area.

49 Claims, 8 Drawing Sheets

U.S. PATENT DOCUMENTS

| | | | |
|---|---|---|---|
| 3,713,100 A * | 1/1973 | Hemstreet | 382/222 |
| 3,898,617 A | 8/1975 | Kashioka et al. | |
| 4,110,737 A * | 8/1978 | Fahey | 382/221 |
| 4,677,476 A | 6/1987 | Kondo | |
| 4,736,437 A * | 4/1988 | Sacks et al. | 382/216 |
| 4,837,618 A | 6/1989 | Hatori et al. | |
| 5,065,440 A * | 11/1991 | Yoshida et al. | 382/219 |
| 5,406,642 A | 4/1995 | Maruya | |
| 5,806,024 A | 9/1998 | Ozawa | |
| 5,809,717 A * | 9/1998 | Scarborough et al. | 52/281 |
| 5,845,241 A | 12/1998 | Owechko | |
| 5,867,593 A * | 2/1999 | Fukuda et al. | 382/176 |
| 5,890,808 A * | 4/1999 | Neff et al. | 382/209 |
| 6,038,069 A | 3/2000 | Yamaguchi | |
| 6,226,606 B1 | 5/2001 | Acero et al. | |
| 6,330,428 B1 | 12/2001 | Lewis et al. | |
| 6,438,165 B2 * | 8/2002 | Normile | 375/240 |
| 6,628,833 B1 * | 9/2003 | Horie | 382/173 |
| 6,661,918 B1 * | 12/2003 | Gordon et al. | 382/173 |
| 6,859,552 B2 * | 2/2005 | Izume et al. | 382/170 |
| 6,907,367 B2 | 6/2005 | Baggenstoss | |
| 7,010,160 B1 * | 3/2006 | Yoshida | 382/162 |
| 2002/0006233 A1 * | 1/2002 | Adachi et al. | 382/289 |

FOREIGN PATENT DOCUMENTS

| | | |
|---|---|---|
| EP | 0973336 A2 | 1/2000 |
| JP | 63-121372 | 5/1988 |
| JP | 02-312383 | 12/1990 |
| JP | 08-079760 | 3/1996 |
| JP | 10-336593 A | 12/1998 |
| JP | 11-328-311 | 11/1999 |
| JP | 2000-078589 A | 3/2000 |
| JP | 2000-312343 | 11/2000 |
| JP | 2001-228900 | 8/2001 |

OTHER PUBLICATIONS

Hiroyuki Hirayama et al., Zatsuon Shori, first edition, The Society of Instrument and Control Engineers, 1985, pp. 182 to 184.

E. Wold et al., "Content-Based Classification, Search, and Retrieval of Audio", IEEE Multimedia, 1996, pp. 27 to 36.

Mototsugu Abe et al., "A Computational Model for Auditory Scene Analysis: Segregation of Multiple Tone Sequences With Individual Rhythms," Japanese Society Of Artificial Intelligence, 1996.

Baghai-Ravary, Beet, and Tokhi "The two-dimensional discrete cosine transform applied to speeddata", Acoustics, Speech, and Signal Processing., 1996 IEEE International Conference, Mar. 1996.

* cited by examiner

SIMILAR AREA

FIG.9B

SIMILAR AREA

FIG.9C

SIGNAL PROCESSING METHOD AND METHOD FOR DETERMINING IMAGE SIMILARITY

This application claims priority to International Application No. PCT/JP02/10749, filed Oct. 16, 2002 and Japanese Patent Application Number JP2001-324255, filed Oct. 22, 2001, each of which are incorporated herein by reference.

TECHNICAL FIELD

This invention relates to a signal processing method and device, a signal processing program, and a recording medium, and particularly to a signal processing method and device, a signal processing program, and a recording medium having a signal processing program recorded thereon for evaluating the similarity in the case where plural image data include a similar pattern.

BACKGROUND ART

For example, partly identical or similar patterns such as images of similar scenes in a video (a collective time section in the video), a logo of a company name in a commercial, and a characters or pattern indicating an owner inserted in an image may be included in different images. In most cases, these similar patterns used because they are related to each image or video to a certain extent. If the similarity can be detected and evaluated, search for and classification or collection of related image or video scenes can be realized.

Figure 1A:
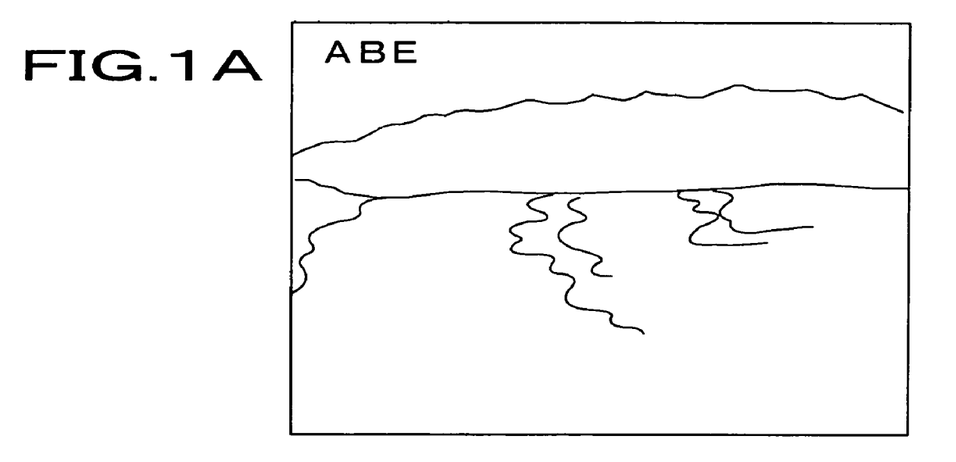
FIGS. 1A and 1B are views for explaining exemplary images including the same logo.
Figure 1B:
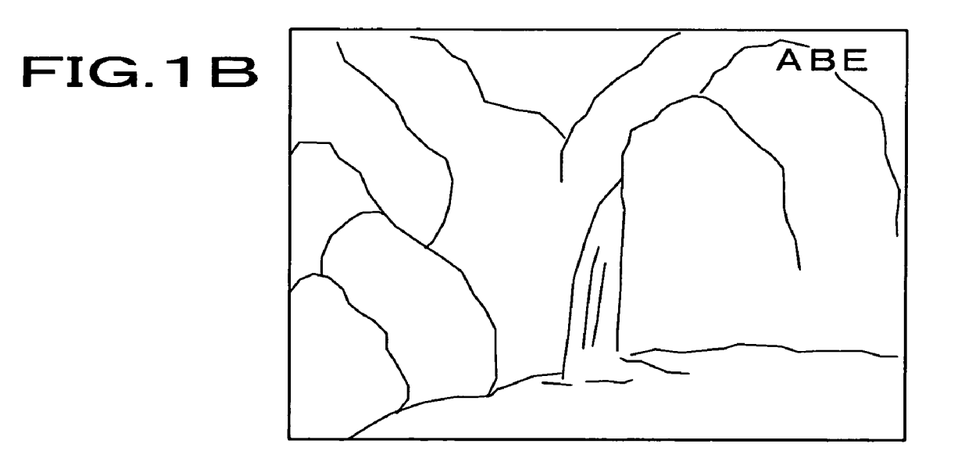

As a specific example, FIGS. 1A and 1B show different images in which the same logo "ABE" is inserted. Such a logo represents, for example, information of an owner of the two images or an enterprise providing a product of a commercial image. As in this case, substantially the same logo may be inserted at different positions in the images. Usually, however, the positions where such a logo is inserted cannot be specified in advance and what pattern is inserted cannot be known in advance, either.

Not only a logo but also the same person, animal, object or background may be inserted in different images or videos.

Meanwhile, as a conventional method for searching for such a similar pattern, the pattern is separately prepared in advance by a certain technique and the pattern id detected by a correlative method, a histogram comparison method or the like.

For example, the Publication of Japanese Laid-Open Patent Application No. 2000-312343 discloses a technique of fast search for the same image as an image that is registered in advance. However, this requires preparation of the same image as the image to be searched for, in advance. Moreover, this technique cannot be applied to detection of a partly similar image constituting a video.

The Publication of Japanese Laid-Open Patent Application No. H11-328311 discloses a technique of detecting a pattern similar to a registered pattern using a correlative method in the case where such a similar pattern exists at a certain position another image. However, also this technique requires registration of the similar pattern in advance and it fails to detect and evaluate partial similarity between two arbitrary images from which a similar pattern cannot be found in advance.

DISCLOSURE OF THE INVENTION

In view of the foregoing status of the art, it is an object of the present invention to provide a signal processing method and device, a signal processing program, and a recording medium having a signal processing program recorded therein that enable evaluation of partial similarity of two or more arbitrary images and automatic extraction of a similar area.

In order to achieve the above-described object, a signal processing method according to the present invention includes: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; and a similarity evaluation step of evaluating the similarity between the plural image data on the basis of the result of the totaling.

The signal processing method may further include a similar area extraction step of extracting a similar area of the plural image data.

In the signal processing method, the conversion parameter may be found using a correlative method. In this case, the conversion parameter is, for example, a position difference and/or luminance ratio at a point where a maximum correlation value between the small area and the other image data is obtained, and at the totaling step, values indicating the degree of similarity between the plural image data are totaled in a space centering the conversion parameter as an axis.

In such a signal processing method, at least one of inputted plural image data is divided into plural small areas and the similarity between each small area and the other image data is found. As these similarity values are totaled, the similarity between the plural image data is evaluated. On the basis of the similarity, a similar area of the plural image data is extracted.

Moreover, in order to achieve the above-described object, a signal processing method according to the present invention includes: a reproduction step of reproducing image data recorded in recording means; a designation step of designating desired image data from the image data that are being reproduced; a division step of dividing the desired image data into plural small areas; a parameter extraction step of extracting a conversion parameter used for converting the small areas so that the small areas become similar to search target image data recorded in the recording means; a totaling step of totaling values indicating the degree of similarity found on the basis of the conversion parameter; a similarity evaluation step of evaluating the similarity between the desired image data and the search target image data on the basis of the result of the totaling; and a similar area detection step of detecting a similar area of the desired image data and the search target image data.

In such a signal processing method, when desired image data is designated from image data that are being reproduced, the image data is divided into small areas and the similarity between each small area and search target image data recorded in the recording means is found. As the similarity values are totaled, the similarity between the plural image data is evaluated and a similar area is extracted on the basis of the similarity.

Moreover, in order to achieve the above-described object, a signal processing method according to the present invention includes: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; a similarity evaluation step of evaluating the similarity between the plural image data on the basis of the result of the totaling; a similar area extraction step of extracting a similar area of the plural image data; a first coding step of coding the similar area of the plural image data extracted at the similar area extraction step; and a second coding step of coding the areas other than the similar area.

In this case, at the first coding step, for example, information of position difference of the similar area, luminance ratio, and shape of the similar area is coded.

In such a signal processing method, at least one of inputted plural image data is divided into plural small areas and the similarity between each small area and the other image data is found. As the similarity values are totaled, the similarity between the plural image data is evaluated. On the basis of the similarity, a similar area of the plural image data is extracted, and the similar area and the other areas are separately coded.

In order to achieve the above-described object, a signal processing device according to the present invention includes: division means for inputting plural image data and dividing at least one of the plural image data into plural small areas; parameter extraction means for extracting a conversion parameter used for converting the small areas so that the small areas become similar to the other image data; totaling means for totaling values indicating the degree of similarity found on the basis of the conversion parameter; and similarity evaluation means for evaluating the similarity between the plural image data on the basis of the result of the totaling.

The signal processing device may further include similar area extraction means for extracting a similar area of the plural image data.

In the signal processing device, the conversion parameter may be found using a correlative method. In this case, the conversion parameter is, for example, a position difference and/or luminance ratio at a point where a maximum correlation value between the small area and the other image data is obtained, and at the totaling means totals values indicating the degree of similarity between the plural image data in a space centering the conversion parameter as an axis.

In such a signal processing device, at least one of inputted plural image data is divided into plural small areas and the similarity between each small area and the other image data is found. As these similarity values are totaled, the similarity between the plural image data is evaluated. On the basis of the similarity, a similar area of the plural image data is extracted.

Moreover, in order to achieve the above-described object, a signal processing device according to the present invention includes: recording means for recording plural image data; reproduction means for reproducing the image data recorded in the recording means; designation means for designating desired image data from the image data that are being reproduced; division means for dividing the desired image data into plural small areas; parameter extraction means for extracting a conversion parameter used for converting the small areas so that the small areas become similar to search target image data recorded in the recording means; totaling means for totaling values indicating the degree of similarity found on the basis of the conversion parameter; similarity evaluation means for evaluating the similarity between the desired image data and the search target image data on the basis of the result of the totaling; and similar area detection means for detecting a similar area of the desired image data and the search target image data.

In such a signal processing device, when desired image data is designated from image data that are being reproduced, the image data is divided into small areas and the similarity between each small area and search target image data recorded in the recording means is found. As the similarity values are totaled, the similarity between the plural image data is evaluated and a similar area is extracted on the basis of the similarity.

Moreover, in order to achieve the above-described object, a signal processing device according to the present invention includes: division means for inputting plural image data and dividing at least one of the plural image data into plural small areas; parameter extraction means for extracting a conversion parameter used for converting the small areas so that the small areas become similar to the other image data; totaling means for totaling values indicating the degree of similarity found on the basis of the conversion parameter; similarity evaluation means for evaluating the similarity between the plural image data on the basis of the result of the totaling; similar area extraction means for extracting a similar area of the plural image data; first coding means for coding the similar area of the plural image data extracted by the similar area extraction means; and second coding means for coding the areas other than the similar area.

In this case, the first coding means codes, for example, information of position difference of the similar area, luminance ratio, and shape of the similar area.

In such a signal processing device, at least one of inputted plural image data is divided into plural small areas and the similarity between each small area and the other image data is found. As the similarity values are totaled, the similarity between the plural image data is evaluated. On the basis of the similarity, a similar area of the plural image data is extracted, and the similar area and the other areas are separately coded.

In order to achieve the above-described object, a signal processing program according to the present invention includes: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; and a similarity evaluation step of evaluating the similarity between the plural image data on the basis of the result of the totaling.

The signal processing program may further include a similar area extraction step of extracting a similar area of the plural image data.

In the signal processing program, the conversion parameter may be found using a correlative method. In this case, the conversion parameter is, for example, a position difference and/or luminance ratio at a point where a maximum correlation value between the small area and the other image data is obtained, and at the totaling step, values indicating the degree of similarity between the plural image data are totaled in a space centering the conversion parameter as an axis.

In such a signal processing program, at least one of inputted plural image data is divided into plural small areas and the similarity between each small area and the other image data is found. As these similarity values are totaled, the similarity between the plural image data is evaluated. On the basis of the similarity, a similar area of the plural image data is extracted.

Moreover, in order to achieve the above-described object, a signal processing program according to the present invention includes: a reproduction step of reproducing image data recorded in recording means; a designation step of designating desired image data from the image data that are being reproduced; a division step of dividing the desired image data into plural small areas; a parameter extraction step of extracting a conversion parameter used for converting the small areas so that the small areas become similar to search target image data recorded in the recording means; a totaling step of totaling values indicating the degree of similarity found on the basis of the conversion parameter; a similarity evaluation step of evaluating the similarity between the desired image data and the search target image data on the basis of the result of the totaling; and a similar area detection step of detecting a similar area of the desired image data and the search target image data.

In such a signal processing program, when desired image data is designated from image data that are being reproduced, the image data is divided into small areas and the similarity between each small area and search target image data recorded in the recording means is found. As the similarity values are totaled, the similarity between the plural image data is evaluated and a similar area is extracted on the basis of the similarity.

Moreover, in order to achieve the above-described object, a signal processing program according to the present invention includes: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; a similarity evaluation step of evaluating the similarity between the plural image data on the basis of the result of the totaling; a similar area extraction step of extracting a similar area of the plural image data; a first coding step of coding the similar area of the plural image data extracted at the similar area extraction step; and a second coding step of coding the areas other than the similar area.

In this case, at the first coding step, for example, information of position difference of the similar area, luminance ratio, and shape of the similar area is coded.

In such a signal processing program, at least one of inputted plural image data is divided into plural small areas and the similarity between each small area and the other image data is found. As the similarity values are totaled, the similarity between the plural image data is evaluated. On the basis of the similarity, a similar area of the plural image data is extracted, and the similar area and the other areas are separately coded.

In order to achieve the above-described object, a recording medium according to the present invention is a computer-controllable recording medium having a signal processing program recorded therein, the signal processing program including: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; and a similarity evaluation step of evaluating the similarity between the plural image data on the basis of the result of the totaling.

The signal processing program may further include a similar area extraction step of extracting a similar area of the plural image data.

In the signal processing program, the conversion parameter may be found using a correlative method. In this case, the conversion parameter is, for example, a position difference and/or luminance ratio at a point where a maximum correlation value between the small area and the other image data is obtained, and at the totaling step, values indicating the degree of similarity between the plural image data are totaled in a space centering the conversion parameter as an axis.

In the signal processing program recorded in such a recording medium, at least one of inputted plural image data is divided into plural small areas and the similarity between each small area and the other image data is found. As these similarity values are totaled, the similarity between the plural image data is evaluated. On the basis of the similarity, a similar area of the plural image data is extracted.

Moreover, in order to achieve the above-described object, a recording medium according to the present invention is a computer-controllable recording medium having a signal processing program recorded therein, the signal processing program including: a reproduction step of reproducing image data recorded in recording means; a designation step of designating desired image data from the image data that are being reproduced; a division step of dividing the desired image data into plural small areas; a parameter extraction step of extracting a conversion parameter used for converting the small areas so that the small areas become similar to search target image data recorded in the recording means; a totaling step of totaling values indicating the degree of similarity found on the basis of the conversion parameter; a similarity evaluation step of evaluating the similarity between the desired image data and the search target image data on the basis of the result of the totaling; and a similar area detection step of detecting a similar area of the desired image data and the search target image data.

In the signal processing program recorded in such a recording medium, when desired image data is designated from image data that are being reproduced, the image data is divided into small areas and the similarity between each small area and search target image data recorded in the recording means is found. As the similarity values are totaled, the similarity between the plural image data is evaluated and a similar area is extracted on the basis of the similarity.

Moreover, in order to achieve the above-described object, a recording medium according to the present invention is a computer-controllable recording medium having a signal processing program recorded therein, the signal processing program including: a division step of inputting plural image data and dividing at least one of the plural image data into plural small areas; a parameter extraction step of extracting a conversion parameter used for converting the small areas so that the small areas become similar to the other image data; a totaling step of totaling values indicating the degree of similarity found on the basis of the conversion parameter; a similarity evaluation step of evaluating the similarity between the plural image data on the basis of the result of the totaling; a similar area extraction step of extracting a similar area of the plural image data; a first coding step of coding the similar area of the plural image data extracted at the similar area extraction step; and a second coding step of coding the areas other than the similar area.

In this case, at the first coding step of the signal processing program, for example, information of position difference of the similar area, luminance ratio, and shape of the similar area is coded.

In the signal processing program recorded in such a recording medium, at least one of inputted plural image data is divided into plural small areas and the similarity between each small area and the other image data is found. As the similarity values are totaled, the similarity between the plural image data is evaluated. On the basis of the similarity, a similar area of the plural image data is extracted, and the similar area and the other areas are separately coded.

The other objects of the present invention and specific advantages provided by the present invention will be further clarified by the following description of an embodiment.

BRIEF DESCRIPTION OF THE DRAWINGS

FIGS. 3A to 3C are views for explaining the operation of the signal processing device.

FIGS. 9A to 9C are views for explaining the operation of the image coding device. FIG. 9A shows detection of a similar area a.

BEST MODE FOR CARRYING OUT THE INVENTION

A specific embodiment to which the present invention is applied will now be described in detail with reference to the drawings. In this embodiment, the present invention is applied to a signal processing device which evaluates partial similarity of two or more arbitrary images and automatically extracts a similar area. In the following description, two different images are used inputted images. However, two or more images may be used or plural images acquired from video data or plural partial images acquired from one image may also be used.

Figure 2:
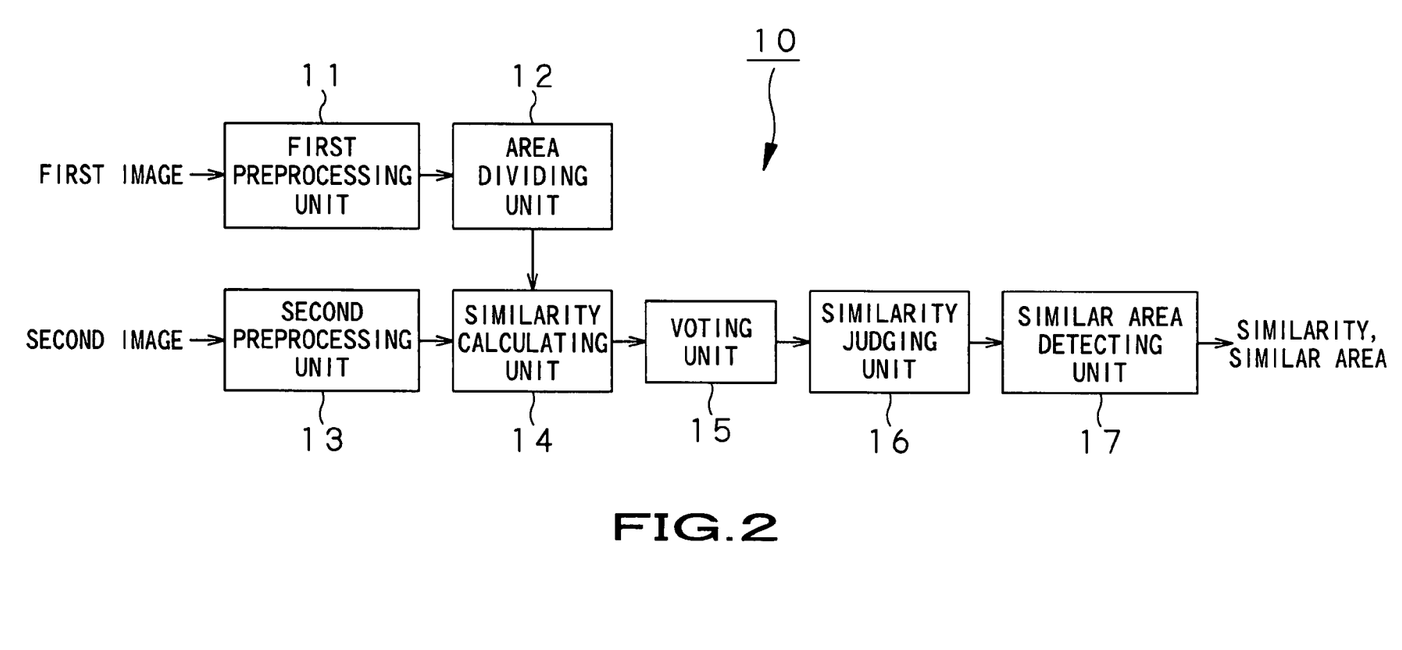
FIG. 2 is a view for explaining the schematic structure of a signal processing device of this embodiment.

First, FIG. 2 shows the schematic structure of a signal processing device of this embodiment. As shown in FIG. 2, a signal processing device 10 has a first preprocessing unit 11, an area dividing unit 12, a second preprocessing unit 13, a similarity calculating unit 14, a voting unit 15, a similarity judging unit 16, and a similar area detecting unit 17.

The first preprocessing unit 11 performs, to a first image of the two images to be compared, known filter processing for extracting image characteristics such as differentiation or high-order differentiation, known transform processing such as color-reducing arithmetic operation, monochromatization or binarization processing, and processing to limit the subsequent processing range on the basis of the characteristic quantity of edge detection, edge density detection, local color histogram or the like. Preprocessing of a combination of the above-described processing may be performed. Alternatively, identical transform may be performed without performing any processing.

Figure 3A:
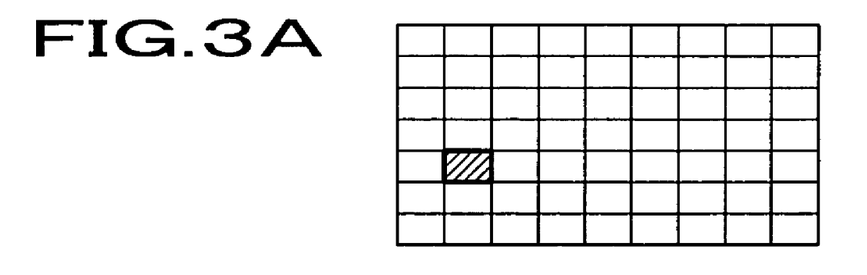
FIG. 3A shows division of a first image into small areas.

The area dividing unit 12 divides the first image into small areas. For example, as shown in FIG. 3A, the area dividing unit 12 divides the first image into 63 small areas. Of course, the number of divisions is not limited to this and can be arbitrarily set. However, it is preferred that the size of a small area is set to be much smaller than that of an anticipated similar area. For example, in the above-described example of FIGS. 1A and 1B, it is preferred that the logo "ABE" is set to be divided into at least plural areas. While the small areas in FIG. 3A are divided in such a manner that they do not overlap each other, the small areas may overlap each other.

The second preprocessing unit 13 performs preprocessing similar to that of the first preprocessing unit 11, to a second image of the two images to be compared. Alternatively, identical transform may be performed without performing any processing, as in the case of the first image.

Figure 3B:
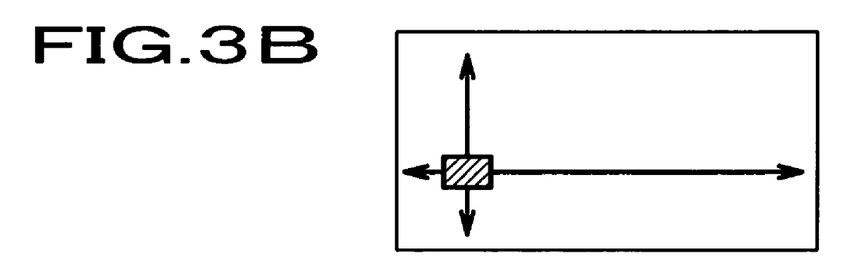
FIG. 3B shows detection of a similar area in a second image using a correlative method.

The similarity calculating unit 14 calculates the correlation between each of the small areas provided by division at the area dividing unit 12 and the second image. Normally, to calculate the correlation, correlation operation is performed for the entire range of the second image using each of the small areas as template, as shown in FIG. 3B. The similarity calculating unit 14 searches for a small area having the largest correlation value of the resulting correlation values, and acquires the correlative value s, position difference dx, dy, and luminance ratio l. The position difference is a parameter indicating the relative positional relation between the original position of this small area in the first image and the position where the maximum correlation value is obtained. The luminance ratio is a multiplication coefficient for the patter of the small area pattern such that the pattern of the small area and the pattern of the second image are most coincident with each other at the position where the maximum correlation value is obtained. For example, when the luminance of the overall image differs because of the difference in conditions, for example, fluctuation of video data, at the time of acquiring the first image and the second image, that difference becomes the coefficient. As the similarity, the square of the correlation value may be used. For the above-described position difference dx, dy, luminance ratio l and similarity s, equivalent characteristic quantities may also be found using a method other than the correlative method.

Figure 3C:
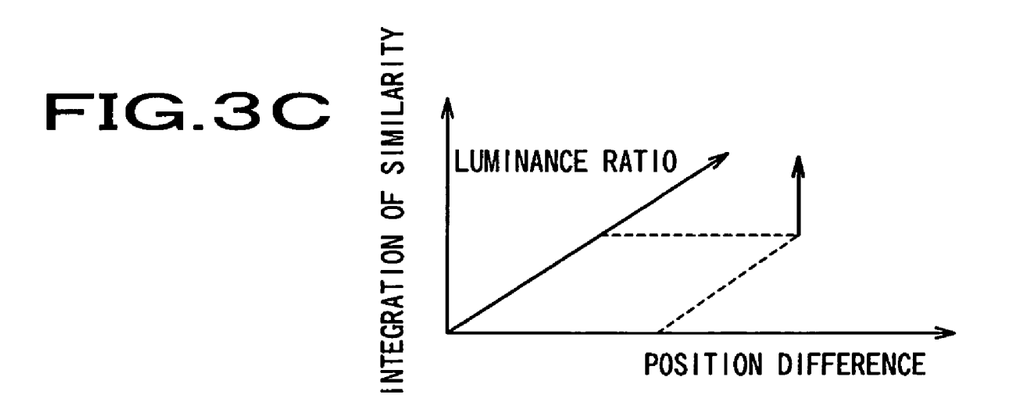
FIG. 3C shows voting for a parameter of that area in a voting space.

The voting unit 15 votes the acquired position difference dx, dy, luminance ratio l and similarity s into a voting space. The voting space is a feature space using the position difference dx, dy and luminance ratio l as variables and using an integral value of the similarity s as a value, as shown in FIG. 3C. The similarity s is integrated at a position having the position difference dx, dy and the luminance ratio l acquired from the small area. Although the position difference dx, dy is shown on a single axis in FIG. 3C, a typical image has two axes in horizontal and vertical directions and therefore has three variables in the voting space. To improve the operation efficiency, one of the axes may be omitted to reduce the number of dimensions.

When the first signal and the second signal include a similar part, the patterns of the corresponding small areas are similar to each other. Therefore, the similarity s is high and the position difference dx, dy and the luminance ratio l are approximately coincident with those of the other small areas.

On the other hand, with respect to a small area corresponding to a part that is not similar, the maximum similarity is acquired at a position that is accidentally most similar. Therefore, the overall similarity s is low and the position difference dx, dy and the luminance ratio l are independent of those of the other small areas.

Therefore, when a similar part exists, voting of plural small areas corresponding to this part concentrates at the same position and a significantly large peak is expected to be formed. When no similar part exists, the similarity is essentially low and voting is dispersed at different positions. Therefore, no significant peak is formed.

Thus, after voting for all the small areas is performed, the similarity judging unit 16 searches for the maximum similarity $s_m$ in the voting space and compares the maximum similarity $s_m$ with a threshold value $s_{thsd}$, thereby judging the similarity.

When the similarity judging unit 16 judges that the similarity is high, the similar area detecting unit 17 detects a similar area. The similar area detecting unit 17 detects a similar area, for example, by selecting only a small area where the position difference dx, dy and the luminance ratio l are sufficiently close to the position difference $dx_m$, $dy_m$ and the luminance ratio $l_m$ of the peak position.

Figure 4:
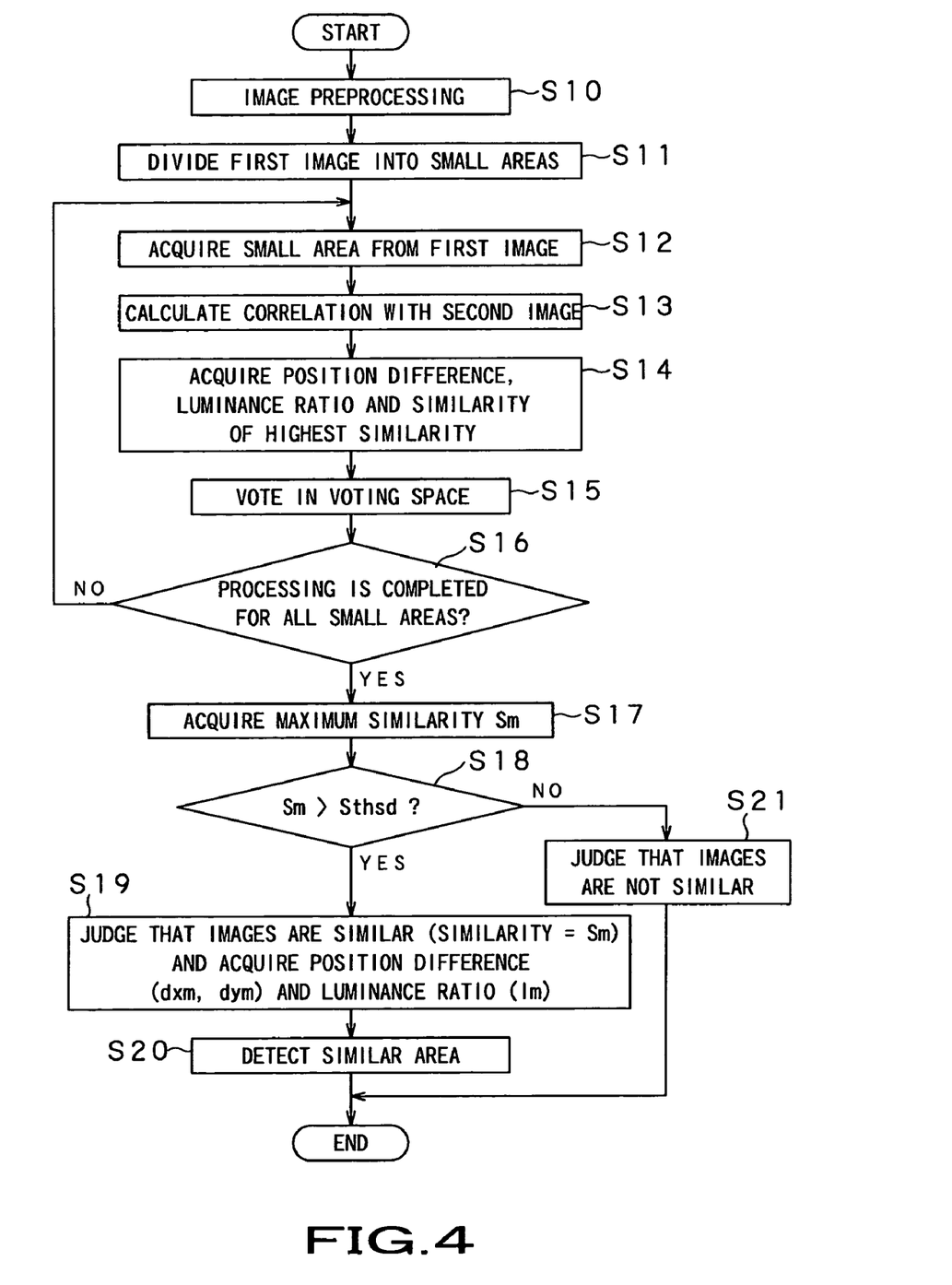
FIG. 4 is a flowchart for explaining the operation of the signal processing device.

The operation of the signal processing device 10 having the above-described structure will now be described with reference to the flowchart of FIG. 4. First at step S10, the preprocessing as described above is performed to the first image and the second image.

At the next step S11, the first image is divided into small areas as described above, and at the next step S12, one of the small areas is selected.

At step S13, the correlation between the small area selected at step S12 and the second image is calculated. For example, the correlative method is used for the entire range of the second image with respect to the selected small area, thus calculating the correlation between the small area and the second image.

At step S14, the largest value of the similarity obtained at step S13 is found and the similarity s, the position difference dx, dy and the luminance ratio l are acquired.

At the next step S15, the similarity s, the position difference dx, dy and the luminance ratio l acquired at step S14 are voted in the voting space. That is, the similarity s is integrated at the position having the position difference dx, dy and the luminance ratio l acquired from the small area.

At step S16, whether processing is completed for all the small areas or not is judged. If there still is a small area for which processing is not completed at step S16, the processing returns to step S12 and the above-described processing is repeated for the remaining small area. If processing is completed for all the small areas, the processing goes to step S17.

At step S17, the maximum similarity $s_m$ in the voting space is searched for and acquired. At the next step S18, whether the maximum similarity $s_m$ exceeds a predetermined threshold value $s_{thsd}$ or not is judged. If the maximum similarity $s_m$ does not exceed the predetermined threshold value $s_{thsd}$ (NO) at step S18, it is assumed that no significant peak is formed and the processing goes to step S21. Then, it is judged that the first image and the second image are not similar to each other, and the processing ends. If the maximum similarity $s_m$ exceeds the predetermined threshold value $s_{thsd}$ (YES) at step S18, it is assumed that a significant peak is formed and the processing goes to step S19.

At step S19, it is judged that the first image and the second image are similar to each other, and the position difference $dx_m$, $dy_m$ and the luminance ratio $l_m$ are acquired. The similarity between the first image and the second image is assumed to be the maximum similarity $s_m$.

At step S20, a similar area is detected. Specifically, only a small area having the position difference dx, dy and the luminance ratio l that are sufficiently close to the position difference $dx_m$, $dy_m$ and the luminance ratio $l_m$ of the peak position is selected, and the processing ends.

By carrying out the processing as described above, the signal processing device 10 of this embodiment perform detection and evaluation of significant similarity or non-similarity between two arbitrary images from which a similar pattern is not found in advance.

Moreover, as described above, the signal processing device 10 can detect similar areas by selecting only a small area having the position difference dx, dy and the luminance ratio l that are sufficiently close to the position difference $dx_m$, $dy_m$ and the luminance ratio $l_m$ of the peak position.

In the above description, the similarity s, the position difference dx, dy and the luminance ratio l at one position having the highest correlation with the second image are acquired for each small area and voting is then performed. However, the processing is not limited to this and the similarity s, the position difference dx, dy and the luminance ratio l at several positions having high correlation may be acquired and voting may be then performed.

In the above description, only the maximum similarity $s_m$ at the peak position in the voting space is compared with the threshold value $s_{thsd}$, and if it exceeds the threshold value $s_{thsd}$, the small area on which voting is performed for that peak is found. However, the processing is not limited to this, and even when the second image includes plural parts similar to those of the first image, all these similar parts can be extracted.

Figure 5:
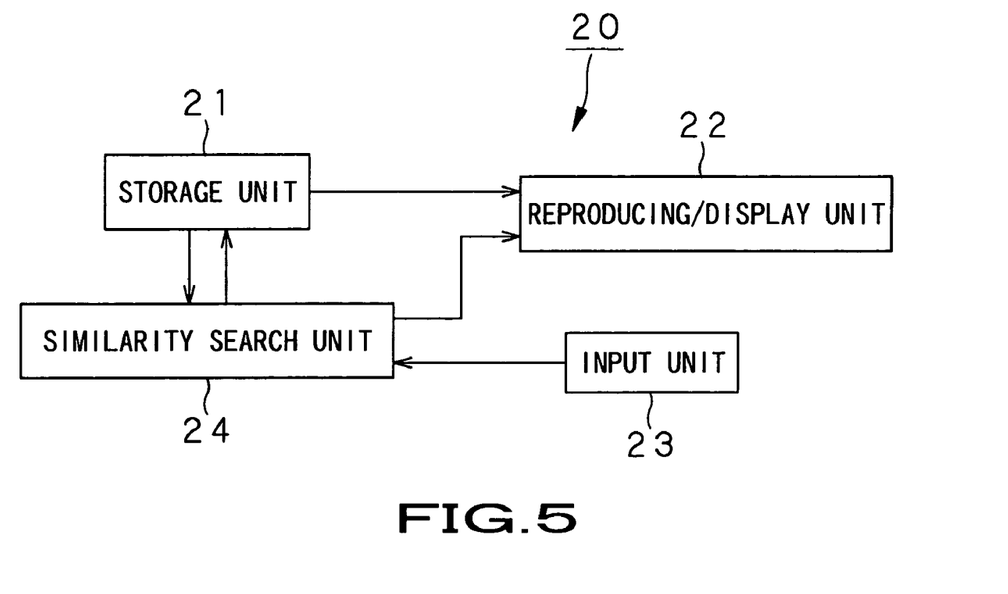
FIG. 5 is a view for explaining the schematic structure of a video/image search device to which the signal processing device is applied.

The above-described signal processing device 10 can be used, for example in a video/image search device 20 as shown in FIG. 5. This video/image search device 20 is adapted for searching a recorded video or image for a similar part.

As shown in FIG. 5, the video/image search device 20 has a recording unit 21, a reproducing/display unit 22, an input unit 23, and a similarity search unit 24. The similarity search unit 24 is equivalent to the above-described signal processing device 10.

Figure 6:
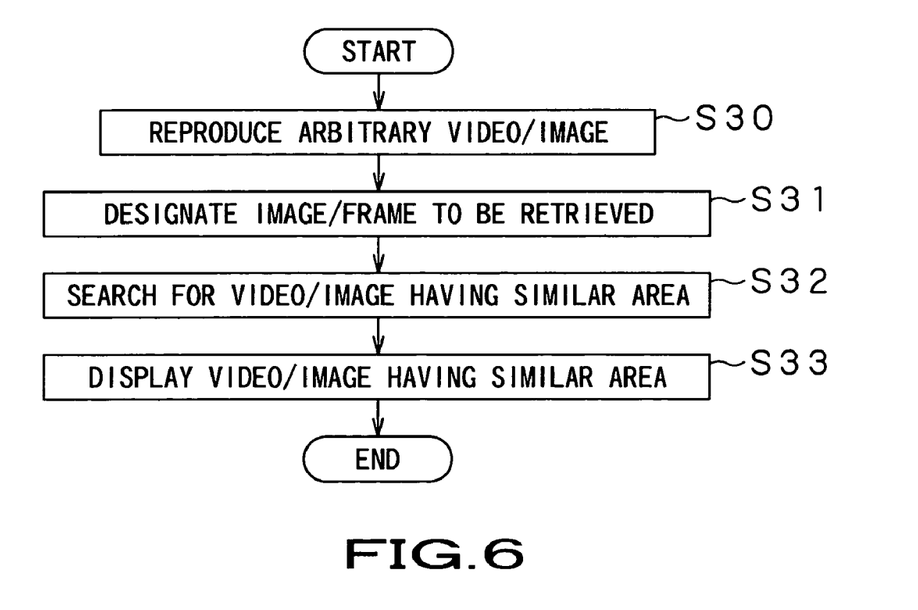
FIG. 6 is a flowchart for explaining the operation of the video/image search device.

The operation of the video/image search device 20 having such a structure will now be described with reference to the flowchart of FIG. 6. In the recording unit 21, video data and image data are recorded. First at step S30, a user reproduces a signal recorded in the recording unit 21 or a signal that is being broadcast in real time, using the reproducing/display unit 22.

At the next step S31, the user designates an image or frame to be retrieved from the signal via the input unit 23. The similarity search unit 24 is notified of the designated image.

At the next step S32, the similarity search unit 24 searches search target data recorded in the recording unit 21 to find video data or image data having a similar part.

Video data or image data as a search target is not limited to data recorded in advance in a magnetic recording medium or the like, and may be a signal that is being broadcast in real time or a signal acquired via a network. In the case of a real-time broadcast signal, the similarity search unit 24 waits for video data or image data having a similar part while receiving the signal.

When a similar part is found, this similar part is displayed on the reproducing/display unit 22 at step S33 and the processing ends.

In the above-described example, the user designates an image or frame to be retrieved from video data or image data that is being reproduced. However, the operation is not limited to this. For example, the user may designate a file name of video data or image data, and search for video data or image data similar to the video data or image data of the designated file name may be performed. Moreover, though the user directly designates an image or frame to be retrieved in the above-described example, the operation is not limited to this and an image or frame may be designated, for example, via an interface with another device.

With such a video/image search device 20, for example, if the user designates a commercial part of a broadcast, highly related commercials such as commercials provided by the same company may be searched because such highly related commercials usually include a similar part. Moreover, when video data or image data designated by the user is commonly used for similar broadcast programs, such similar broadcast programs may be searched.

Figure 7:
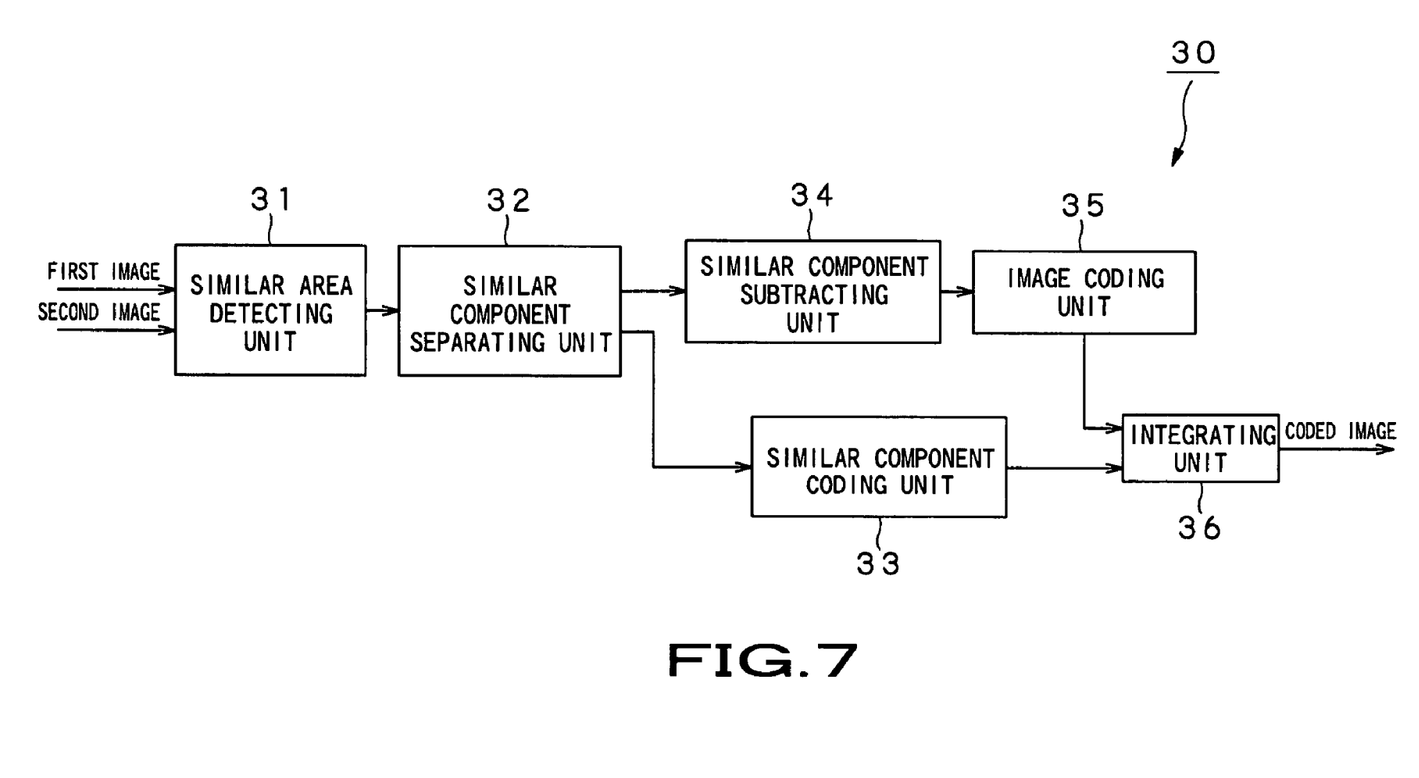
FIG. 7 is a view for explaining the schematic structure of an image coding device using the signal processing device.

The above-described signal processing device 10 can also be used, for example, in an image coding device 30 as shown in FIG. 7. Specifically, the above-described signal processing device 10 is provided in the image coding device 30 and preprocessing to collectively code similar parts of plural images (including different partial images of one image) is performed in advance, thereby improving the coding efficiency (compression efficiency).

As shown in FIG. 7, the image coding device 30 has a similar area detecting unit 31, a similar component separating unit 32, a similar component coding unit 33, a similar component subtracting unit 34, an image coding unit 35, and an integrating unit 36. The similar area detecting unit 31 is equivalent to the above-described signal processing device 10.

Figure 8:
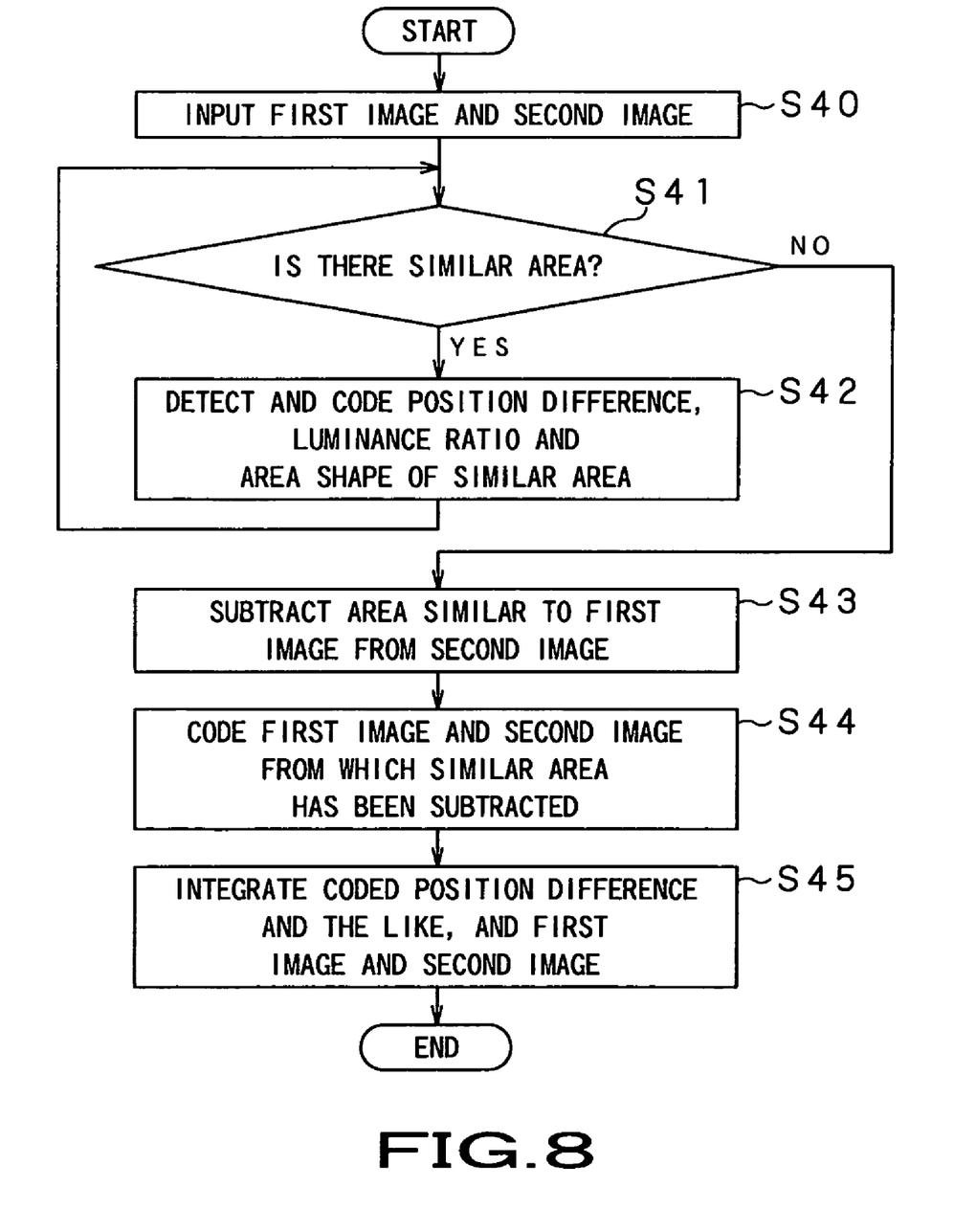
FIG. 8 is a flowchart for explaining the operation of the image coding device.
Figure 9A:
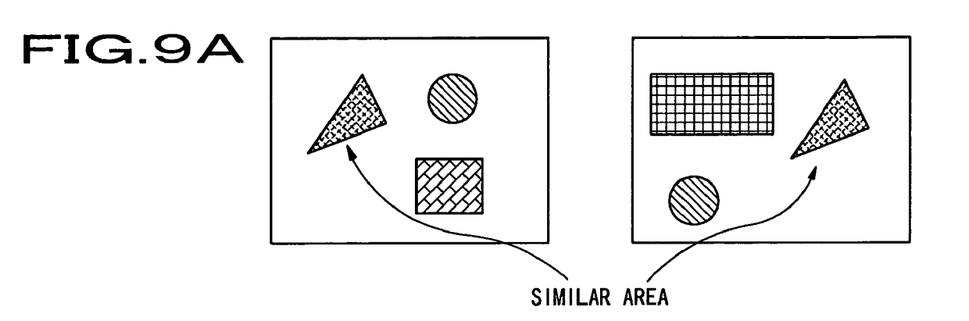
Figure 9B:
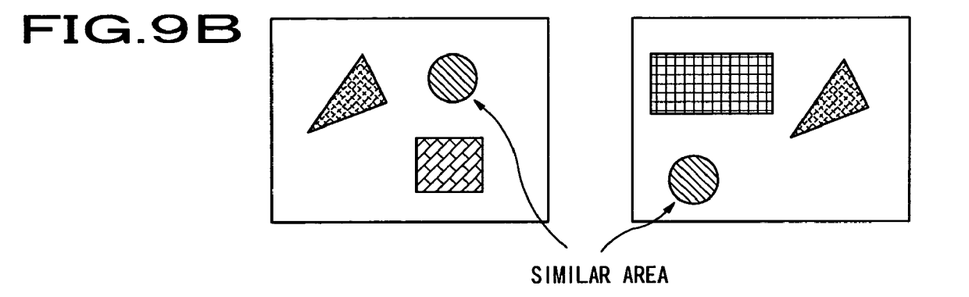
FIG. 9B shows detection of a similar area b.

The operation of the image coding device 30 having such a structure will now be described with reference to the flowchart of FIG. 8 and FIGS. 9A to 9C. First at step S40, the similar area detecting unit 31 inputs a first image and a second image. In FIGS. 9A and 9B, the first image is shown on the left side and the second image is shown on the right side.

At the next step S41, the similar area detecting unit 31 detects whether the second image includes a part similar to a part of the first image or not. If the second image includes a similar part (YES) at step S41, the processing goes to step S42. If not, the processing goes to step S43.

At step S42, the similar component separating unit 32 extracts the position difference, luminance ratio and area shape of the similar area a, as shown in FIG. 9A, and the similar component coding unit 33 codes these. Then, the processing returns to step S41 and another similar part is detected. Thus, a similar area b is detected as shown in FIG. 9B and the position difference, luminance ratio and area shape of the similar area b are coded.

Figure 9C:
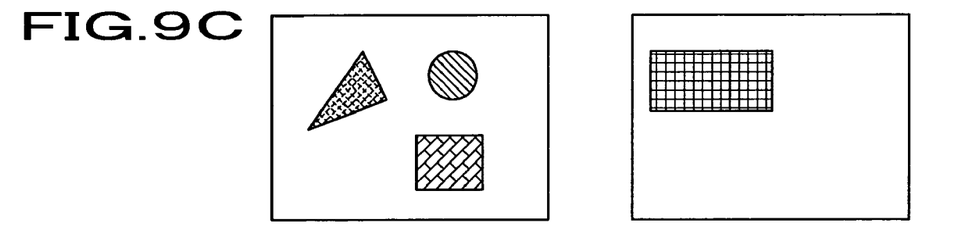
FIG. 9C shows subtraction of the similar areas from a second image.

After all similar sections are extracted and coded, the similar component subtracting unit 34 at step S43 subtracts the parts similar to those of the first image from the second image, as shown in FIG. 9C.

At step S44, the image coding unit 35 codes the first image and the second image from which the similar parts have been subtracted. For this coding, a typical image coding method such as a DCT (discrete cosine transform) method or a wavelet method can be used.

At step S45, the integrating unit 36 integrates the information of the position difference and the like of the similar areas coded at step S42 and the first and second images coded at step S44, as one code sequence, and outputs the code sequence. Then, the processing ends.

With this image coding device 30, since a general coding method is directly applied to the first image, the coding efficiency is the same as that of the typical coding method. As for the second image, however, since the parts similar to those of the first image have been subtracted, the quantity of information is reduced. Therefore, the coding efficiency can be improved, compared with the case of using the ordinary coding method as it is.

As this technique of the image coding device 30 is applied to compression of a dynamic image including plural continuous images, it can be used as an effective motion vector detecting technique used in the compression system such as MPEG2 (Moving Picture Experts Group 2).

As described above, in the signal processing device of this embodiment, at least one of inputted plural image data is divided into small areas and the similarity of each of the small areas to the other image data is found and integrated to evaluate the overall similarity. Therefore, the similarity of arbitrary image data including a partially similar pattern, which cannot be detected by the conventional technique, can be evaluated, and the similar area can be extracted.

Moreover, as this signal processing device is provided in a video/image search device, by designating a desired video or image of video data or image data that is being reproduced, video data or image data recorded in a recording medium or video data or image data acquired via a network can be searched for video data or image data having a pattern partly similar to the desired video or image.

Furthermore, as this signal processing device is provided in an image coding device and preprocessing to collectively code similar patterns is performed in advance, the coding efficiency can be improved.

The present invention is not limited to the above-described embodiment and various modifications can be made without departing from the scope of the invention.

For example, while the technique of minimizing the secondary error energy, which is the most common similarity evaluation quantity, is used, that is, the correlative method is used in evaluating the similarity in the above description, the present invention is not limited to this and can be applied to other types of similarity evaluation quantity.

INDUSTRIAL APPLICABILITY

According to the present invention, at least one of inputted plural image data is divided into small areas and the similarity of each of the small areas to the other image data is found and integrated to evaluate the overall similarity. Therefore, the similarity of arbitrary image data including a partially similar pattern, which cannot be detected by the conventional technique, can be evaluated, and the similar area can be extracted. Moreover, this can be used to search for video data or image data having a pattern partially similar to a desired video or image. Furthermore, as preprocessing to collectively code similar patterns is performed in advance, the coding efficiency can be improved.

What is claimed is:

1. A signal processing method comprising:
   inputting plural image data and dividing at least one of the plural image data into plural small areas via a processor controlled system;
   comparing a plurality of the small areas with other image data and identifying similarity parameters based on the comparison via a processor controlled system; and generating a conversion parameter that is applied to the small areas prior to determination of the similarity parameters;
   making a similarity determination for at least portions of the plural image data based on the similarity parameters; and wherein individual similarity values indicating the similarity of each divided small area with the other image data are totaled, the totaled value indicating a degree of similarity based on the similarity parameters.

2. The signal processing method as claimed in claim 1, further comprising a designating a similar area of the plural image data.

3. The signal processing method as claimed in claim 2, wherein the designation of a similar area is based upon the determination that a similarity parameter is substantially equal to a similarity parameter for a reference image data.

4. The signal processing method as claimed in claim 2, wherein said image data designated as being similar is extracted from the plural image data and coded separately from the remainder of the plural image data.

5. The signal processing method as claimed in claim 1, wherein the similarity parameter is found using a correlative method.

6. The signal processing method as claimed in claim 5, wherein the similarity parameter is a change of luminance value.

7. The signal processing method as claimed in claim 1, wherein the totaled value indicating the degree of similarity is proportional to similarity between the compared image data.

8. The signal processing method as claimed in claim 7, wherein a correlation value between the plural image data or the square of the correlation value is used to determine similarity.

9. The signal processing method as claimed in claim 1, wherein the plural image data is comprised of different partial image data of one image.

10. The signal processing method as claimed in claim 1, wherein said comparing step includes comparing each of the plural small areas with the other image data.

11. The signal processing method as claimed in claim 10, wherein said similarity determination step includes determining if a maximum similarity found for all of the plural small areas exceeds a threshold similarity amount.

12. The signal processing method as claimed in claim 10, wherein said other image data is a second image distinct from the divided plural image data.

13. The signal processing method as claimed in claim 12, wherein each of the plural small areas is compared to the entire range of said second image.

14. A signal processing method comprising:
reproducing recorded image data;
dividing the reproduced image data into plural small areas via a processor controlled system;
comparing a plurality of the small areas with other image data and identifying similarity parameters based on the comparison via a processor controlled system; and generating a conversion parameter that is applied to the small areas prior to determination of the similarity parameters;
making a similarity determination for at least a portion of the image data based on the similarity parameters; and wherein individual similarity values indicating the similarity of each divided small area with the other image data are totaled, the totaled value indicating a degree of similarity based on the similarity parameters.

15. The signal processing method as claimed in claim 14, wherein the compared image data is acquired from a network or a recorded broadcast signal.

16. The signal processing method as claimed in claim 14, wherein said comparing step includes comparing each of the plural small areas with the other image data.

17. The signal processing method as claimed in claim 16, wherein said similarity determination step includes determining if a maximum similarity found for all of the plural small areas exceeds a threshold similarity amount.

18. The signal processing method as claimed in claim 16, wherein said other image data is a second image distinct from the divided plural image data.

19. The signal processing method as claimed in claim 18, wherein each of the plural small areas is compared to the entire range of said second image.

20. A signal processing device comprising:
division means for dividing plural image data into plural small areas via a processor controlled system;
comparing means for comparing a plurality of the small areas with other image data and identifying similarity parameters based on the comparison via a processor controlled system; and generating a conversion parameter that is applied to the small areas prior to determination of the similarity parameters;
similarity determination means for making a similarity determination for at least portions of the plural image data with respect to the other image data based on the similarity parameters; and wherein individual similarity values indicating the similarity of each divided small area with the other image data are totaled, the totaled value indicating a degree of similarity based on the similarity parameters.

21. The signal processing device as claimed in claim 20, further comprising means for designating a similar area of the plural image data.

22. The signal processing device as claimed in claim 21, wherein the means for designating a similar area determines that a similarity parameter is substantially equal to a similarity parameter for a reference image data.

23. The signal processing device as claimed in claim 21, further comprising an extracting means that extracts said image data designated as being similar from the plural image data such that the similar image data is coded separately from the remainder of the plural image data.

24. The signal processing device as claimed in claim 20, wherein the similarity parameter is found using a correlative method.

25. The signal processing device as claimed in claim 24, wherein the similarity parameters is a change of luminance value.

26. The signal processing device as claimed in claim 20, wherein the totaled value indicating the degree of similarity are proportional to the similarity between the plural image data.

27. The signal processing device as claimed in claim 26, wherein a correlation value between the plural image data or the square of the correlation value is used to determine similarity.

28. The signal processing device as claimed in claim 20, wherein the plural image data are different partial image data of one image.

29. The signal processing device as claimed in claim 20, wherein said comparing means compares each of the plural small areas with the other image data.

30. The signal processing device as claimed in claim 29, wherein said similarity determination means determines if a maximum similarity found for all of the plural small areas exceeds a threshold similarity amount.

31. The signal processing device as claimed in claim 29, wherein said other image data is a second image distinct from the divided plural image data.

32. The signal processing device as claimed in claim 31, wherein each of the plural small areas is compared to the entire range of said second image.

33. A signal processing device comprising:
means for reproducing image data recorded in a recording means;
division means for dividing the image data into plural small areas via a processor controlled system;
comparing means for comparing a plurality of the small areas with other portions of image data and identifying similarity parameters based on the comparison via a processor controlled system; and generating a conversion parameter that is applied to the small areas prior to determination of the similarity parameters;

making a similarity determination for at least a portion of the image data based on the similarity parameters; and wherein individual similarity values indicating the similarity of each divided small area with the other image data are totaled, the totaled value indicating a degree of similarity based on the similarity parameters.

34. The signal processing device as claimed in claim 33, wherein the compared image data is acquired from a network or a recorded broadcast signal.

35. A signal processing device comprising:
means for dividing plural image data into plural small areas via a processor controlled system;
comparing a plurality of the small areas with other portions of image data and identifying similarity parameters based on the comparison via a processor controlled system; and generating a conversion parameter that is applied to the small areas prior to determination of the similarity parameters;
making a similarity determination for at least a portion of the image data based on the similarity parameters; and wherein individual similarity values indicating the similarity of each divided small area with the other image data are totaled, the totaled value indicating a degree of similarity based on the similarity parameters.

36. The signal processing device as claimed in claim 35, wherein the similarity parameters are based upon luminance ratio, and shape of the similar area.

37. A signal processing program embodied in a computer readable electronic memory comprising:
means for dividing plural image data into plural small areas via a processor controlled system;
means for comparing a plurality of the small areas with other portions of image data and identifying similarity parameters based on the comparison via a processor controlled system, and generating a conversion parameter that is applied to the small areas prior to determination of the similarity parameters;
means for making a similarity determination for the plural image data based on the similarity parameters; and wherein individual similarity values indicating the similarity of each divided small area with the other image data are totaled, the totaled value indicating a degree of similarity based on the similarity parameters.

38. The signal processing program embodied in a computer readable electronic memory as claimed in claim 37, further comprising a means for designating a similar area of the plural image data.

39. The signal processing program embodied in a computer readable electronic memory as claimed in claim 38, wherein the designated similar area is based upon the determination that a similarity parameter is substantially equal to a similarity parameter for a reference image data.

40. The signal processing program embodied in a computer readable electronic memory as claimed in claim 38, further comprising an extracting means that extracts said image data designated as being similar from the plural image data such that the similar image data is coded separately from the remainder of the plural image data.

41. The signal processing program embodied in a computer readable electronic memory as claimed in claim 37, wherein the similarity parameter is found using a correlative method.

42. The signal processing program embodied in a computer readable electronic memory as claimed in claim 41, wherein the similarity parameter is a change of luminance value.

43. The signal processing program embodied in a computer readable electronic memory as claimed in claim 37, wherein the totaled value indicating the degree of similarity is proportional to the similarity between the compared image data.

44. The signal processing program embodied in a computer readable electronic memory as claimed in claim 43, wherein a correlation value between the plural image data or the square of the correlation value is used to determined similarity.

45. The signal processing program embodied in a computer readable electronic memory as claimed in claim 37, wherein the plural image data are comprised of different partial image data of one image.

46. The signal processing program embodied in a computer readable electronic memory as claimed in claim 37, wherein said means for comparing compares each of the plural small areas with the other image data.

47. The signal processing program embodied in a computer readable electronic memory as claimed in claim 46, wherein said similarity determination means determines if a maximum similarity found for all of the plural small areas exceeds a threshold similarity amount.

48. The signal processing program embodied in a computer readable electronic memory as claimed in claim 46, wherein said other image data is a second image distinct from the divided plural image data.

49. The signal processing program embodied in a computer readable electronic memory as claimed in claim 48, wherein said comparing means compares each of the plural small areas to the entire range of said second image.

* * * * *